US011032444B2

(12) United States Patent
Ikari

(10) Patent No.: US 11,032,444 B2
(45) Date of Patent: Jun. 8, 2021

(54) IMAGE PROCESSING APPARATUS WITH ENHANCED SHOW-THROUGH CORRECTION, AND IMAGE PROCESSING METHOD AND STORAGE MEDIUM THEREFOR

(71) Applicant: CANON KABUSHIKI KAISHA, Tokyo (JP)

(72) Inventor: Daiki Ikari, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/710,248

(22) Filed: Dec. 11, 2019

(65) Prior Publication Data
US 2020/0228678 A1 Jul. 16, 2020

(30) Foreign Application Priority Data

Jan. 15, 2019 (JP) .............................. JP2019-004622

(51) Int. Cl.
H04N 1/407 (2006.01)
H04N 1/409 (2006.01)
H04N 1/40 (2006.01)
H04N 1/00 (2006.01)
H04N 1/60 (2006.01)
H04N 1/405 (2006.01)

(52) U.S. Cl.
CPC ....... H04N 1/4095 (2013.01); H04N 1/00005 (2013.01); H04N 1/4053 (2013.01); H04N 1/40093 (2013.01); H04N 1/6005 (2013.01)

(58) Field of Classification Search
None
See application file for complete search history.

(56) References Cited

U.S. PATENT DOCUMENTS

| 9,565,338 | B2* | 2/2017 | Ikari | G06K 15/1869 |
| 9,736,334 | B2* | 8/2017 | Ikari | H04N 1/4095 |
| 2015/0256715 | A1* | 9/2015 | Ikari | H04N 1/4095 358/3.24 |
| 2015/0373227 | A1* | 12/2015 | Ikari | G06K 15/1869 358/2.1 |
| 2018/0249044 | A1* | 8/2018 | Ikari | G03G 15/5025 |
| 2019/0394357 | A1* | 12/2019 | Sugahara | H04N 1/0097 |

FOREIGN PATENT DOCUMENTS

JP 2015-171099 9/2015

* cited by examiner

Primary Examiner — Dung D Tran
(74) Attorney, Agent, or Firm — Venable LLP

(57) ABSTRACT

The image processing apparatus obtains a degree of variation in signal values of a plurality of pixels included in a region of a predetermined size that includes a pixel of interest of image data obtained by reading a document on which a halftone-processed image has been printed, obtains a feature amount indicating a brightness of the region. The apparatus updates a difference between the obtained feature amount and an index value corresponding to the obtained degree of variation in accordance with whether or not the difference is larger than a predetermined threshold, with respect to a plurality of index values respectively corresponding to a plurality of mutually different degrees of variation, decides a correction value of the pixel of interest using the updated difference and the index value, and corrects a value of the pixel of interest using the decided correction value.

12 Claims, 10 Drawing Sheets

FIG. 9
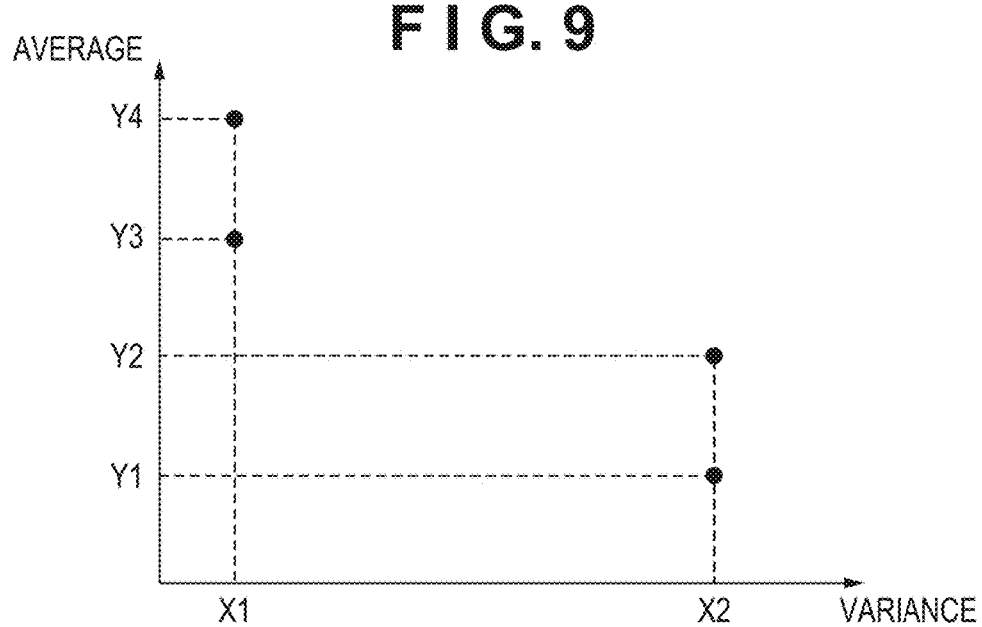
FIG. 10
| VARIANCE | 0 | 1 | 2 | 3 | ... | 127 | 128 |
|---|---|---|---|---|---|---|---|
| AVERAGE | 255 | 240 | 230 | 225 | ... | 105 | 100 |
FIG. 11
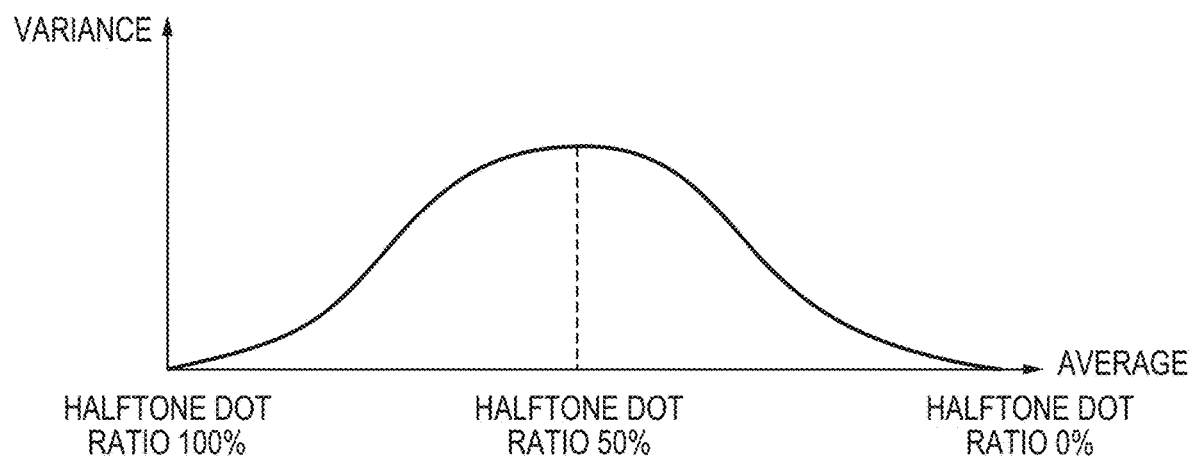

IMAGE PROCESSING APPARATUS WITH ENHANCED SHOW-THROUGH CORRECTION, AND IMAGE PROCESSING METHOD AND STORAGE MEDIUM THEREFOR

BACKGROUND OF THE INVENTION

Field of the Invention

The present invention relates to an image processing apparatus, an image processing method, and a storage medium.

Description of the Related Art

Conventionally, in scanners, copying machines, multifunction peripherals, and the like, when a document is read by using an image reader mounted thereon, problems of "show-through" may occur. This "show-through" is where, when one side (e.g., the front surface) of a document is read by an image reader, an image of the side (e.g., the back surface) which is not read is captured in an image of the front surface. This mainly occurs when an image is printed on both sides (front surface and back surface) of a document to be read. This show-through tends to occur with a high density portion on the surface which is not being read, and occurs due to the amount of light of a light source at the time of reading and the degree of thickness (a degree of transparency of light) of the read document. When this show-through occurs, the image data of the read document (copied material) becomes difficult to see, and the quality of the image data of the copied material deteriorates.

Therefore, as a technique for correcting so as to reduce the show-through, conventionally, the show-through is made to be inconspicuous by lowering the density of the document as a whole (by strongly operating a so-called background color removal function). However, in this case, it has been difficult to remove only the show-through component from an image that includes a show-through region which occurs overlapping with a front surface image.

Therefore, for example, in Japanese Patent Laid-Open No. 2015-171099, the luminance variance and the luminance average of certain region that includes a pixel of interest are obtained, and, for each luminance variance, the brightest luminance average is stored in the LUT. Correcting pixels in a region of the same variance by using the stored luminance average has been proposed. This process focuses on the fact that within the same halftone dot pattern of image data, there is no difference in the luminance variance between a show-through region and a non-show-through region, but there is a difference in the luminance average (the luminance average of the show-through region is lower). That is, the characteristic that components of show-through region are unlikely to be represented as halftone dots when viewed from the front surface, and it hardly affects the luminance variance is used. In this way, by correcting pixels using the stored luminance average for the same variance region, a process of removing only the show-through components from a show-through region which occurs overlapping with the front surface image is realized.

In recent years, however, due to cost reductions, impurities in documents has become conspicuous in pamphlets and business journals. The impurities are specifically minute substances included in the document other than images formed by toner, and are, for example, paper fibers included in the document. Therefore, when the luminance variance for a certain range that includes an impurity is calculated, the luminance variance changes due to the influence of the impurity. In other words, luminance variance occurs even for a paper white region (a region without an image) in which the luminance variance should become zero without impurities.

Therefore, when the technique described in the above-mentioned Japanese Patent Laid-Open No. 2015-171099 is applied, the luminance average of a region that contains an impurity is stored in an LUT, and a correction is executed by using this luminance average, and there is a problem that a false correction of the show-through region is generated.

SUMMARY OF THE INVENTION

An aspect of the present invention is to eliminate the above-mentioned problem with conventional technology.

A feature of the present invention is to provide a technique capable of correcting a show-through region by appropriately removing only show-through components even if there is an impurity in a document.

According to a first aspect of the present invention, there is provided an image processing apparatus, comprising: a memory device that stores instructions; and at least one processor that executes the instructions stored in the memory device to cause the image processing apparatus to function as: a first obtaining unit configured to obtain a degree of variation in signal values of a plurality of pixels included in a region of a predetermined size that includes a pixel of interest of image data obtained by reading a document on which a halftone-processed image has been printed; a second obtaining unit configured to obtain a feature amount indicating a brightness of the region; an updating unit configured to, with respect to a plurality of index values respectively corresponding to a plurality of mutually different degrees of variation, in accordance with whether or not a difference between the feature amount obtained by the second obtaining unit and an index value corresponding to the degree of variation obtained by the first obtaining unit is larger than a predetermined threshold, update the difference; a decision unit configured to decide a correction value of the pixel of interest using the difference updated by the updating unit and the index value corresponding to the degree of variation; and a correction unit configured to correct a value of the pixel of interest using the correction value decided by the decision unit.

According to a second aspect of the present invention, there is provided an image processing method, comprising: obtaining a degree of variation in signal values of a plurality of pixels included in a region of a predetermined size that includes a pixel of interest of image data obtained by reading a document on which a halftone-processed image has been printed; obtaining a feature amount indicating a brightness of the region; with respect to a plurality of index values respectively corresponding to a plurality of mutually different degrees of variation, updating a difference between the obtained feature amount and an index value corresponding to the obtained degree of variation in accordance with whether or not the difference is larger than a predetermined threshold; deciding a correction value of the pixel of interest using the updated difference and the index value corresponding to the degree of variation; and correcting a value of the pixel of interest using the decided correction value.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a diagram showing a relationship between a variance and an average of luminance values of read image data.

FIG. 10 is a diagram showing an example of an LUT generated by a variance-average storage unit according to the embodiment.

FIG. 11 depicts a graph view showing a relationship among a halftone dot ratio, a variance, and an average in a halftone dot image.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
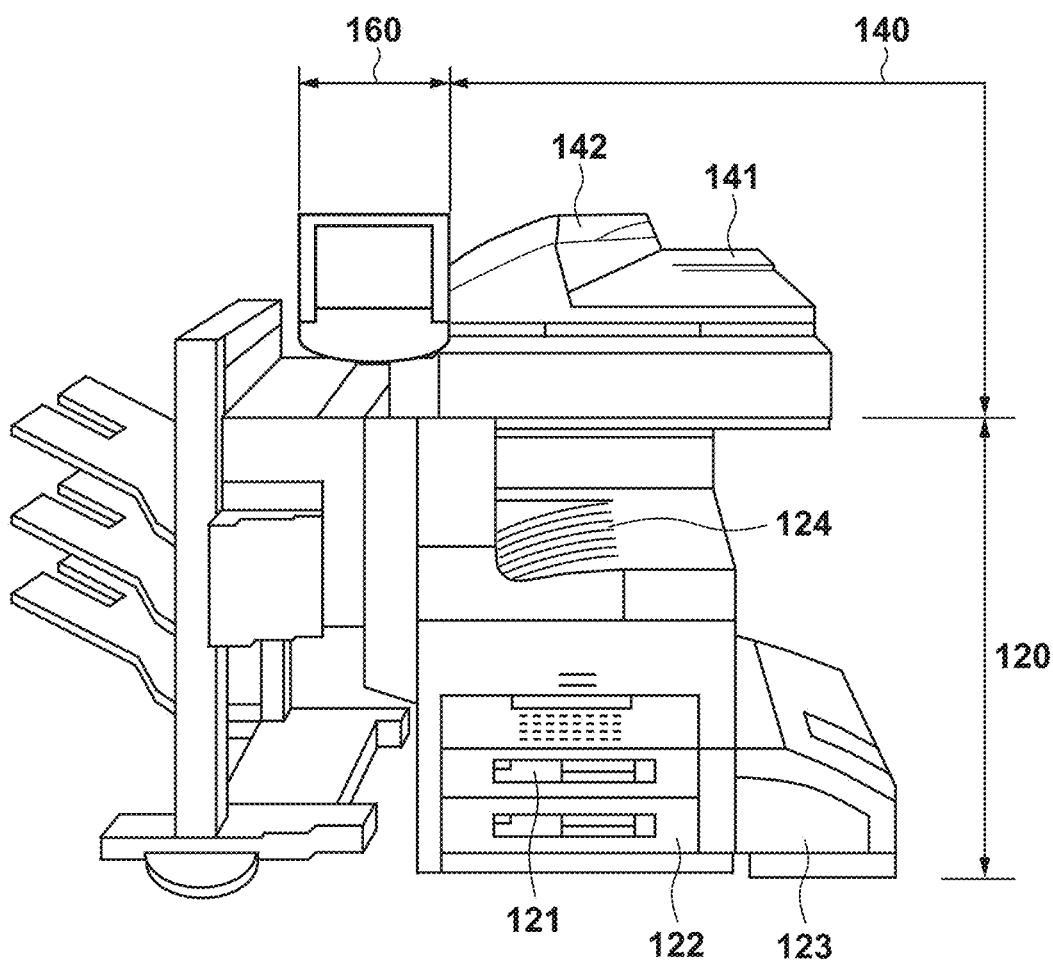
FIG. 1 is a diagram showing an external appearance of a copying machine according to an embodiment of the invention.

FIG. 1 is a diagram showing an external appearance of a copying machine according to an embodiment of the invention.

A scanner 140 converts information of an image on a document into an electric signal by inputting reflected light, which is obtained by exposing and scanning the image on the document in accordance with light emission of an illumination lamp, to a linear image sensor (CCD sensor). The scanner 140 further converts the electric signal into a luminance signal composed of R, G, and B colors, and outputs the luminance signal as image data to a controller 200 (FIG. 3) which is described later.

The document is set in a tray 142 of a document feeder 141. When a user makes an instruction via an operation unit 160 to start reading the document to the scanner 140, the controller 200 sends a document read instruction to the scanner 140. Upon receiving this instruction, the scanner 140 feeds the document one sheet at a time from the tray 142 of the document feeder 141, and performs a reading operation of the document. The document can also be read by placing it on a platen glass described later.

A printer 120 prints an image based image data received from the controller 200 onto a sheet. An image forming method in the embodiment is an electrophotographic method that uses a photosensitive drum, a developer, a fixing unit, and the like. This is a method of transferring toner which has been caused to adhere to the drum to a sheet, and then fixing the toner to the sheet. The printer 120 also includes a plurality of sheet cassettes 121, 122, and 123 that can handle different sheet sizes or different sheet orientations. The printed sheet is discharged to a sheet discharge tray 124.

Figure 2:
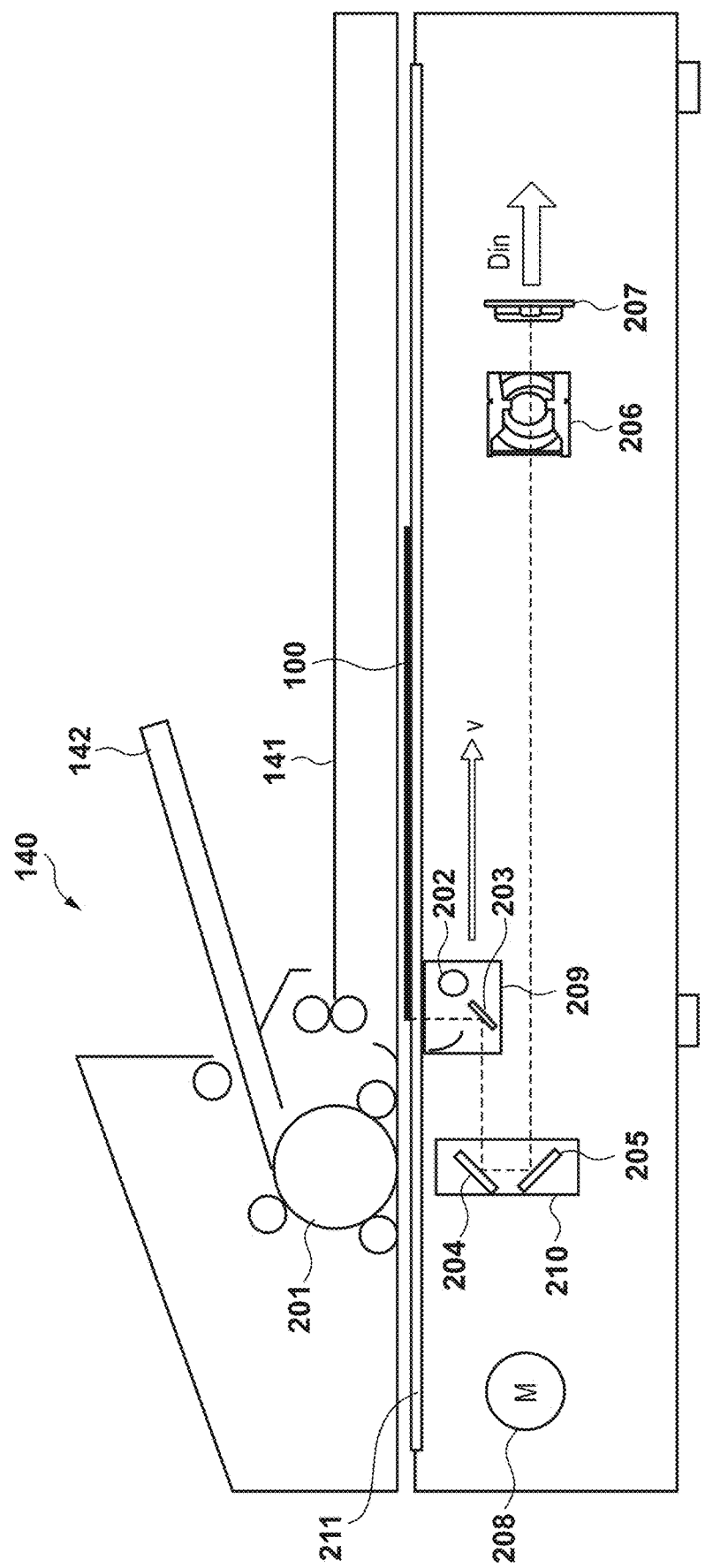
FIG. 2 is a schematic diagram for describing a main configuration and a reading operation of a scanner according to the embodiment.

FIG. 2 is a schematic diagram for describing a main configuration and a reading operation of the scanner 140 according to the embodiment.

A document 100 to be read is placed on the platen glass 211. The document 100 is irradiated by an illumination lamp 202, and the reflected light passes via mirrors 203, 204, and 205 and forms an image on a CCD sensor 207 in accordance with a lens 206. A first mirror unit 209 which includes the mirror 203 and the illumination lamp 202 moves at a speed v, and a second mirror unit 210 which includes the mirrors 204 and 205 moves at a speed v/2 to thereby scan the front surface of the document 100. Movement of the first mirror unit 209 and the second mirror unit 210 is performed by rotationally driving a motor 208. The reflected light inputted to the CCD sensor 207 is converted into an electric signal by the sensor 207, and the electric signal of a pixel is converted into digital data by an A/D converter (not shown) and inputted as a pixel signal Din to the controller 200, which is described later.

The scanner 140 can also read a document in accordance with a "moving document reading operation" that reads a document the document feeder 141 being caused to operate. Firstly, the document 100 in FIG. 2 is placed on the tray 142. Then, the document is first conveyed from the tray 142 by the drive roller 201 onto the document feeder 141 passing by the surface of the platen glass 211, which is under the drive roller 201. In such a moving document reading operation mode, the optical systems such as the first mirror unit 209 and the second mirror unit 210 are set at fixed positions and are not moved. In particular, the first mirror unit 209 is fixed at a position under the drive roller 201. Thus, the document conveyed under the drive roller 201 in accordance with the drive roller 201 is read. In this moving document reading operation mode, since the document is only moved in a fixed direction, a large amount of the document can be consecutively read at high speed.

Here, with respect to the document 100, there are cases where some kind of image such as a photograph, a graph, or text is printed not only on the front surface (the surface irradiated with light by the illumination lamp 202) of the document 100 to be read but also on the non-read surface (the back surface). At this time, "show-through" may occur in which an image on a surface (back surface) which is not read affects the read image data of the front surface. This can occur with any of the reading schemes described above. The degree of show-through varies depending on the thickness (light transmittance) of a medium such as paper of the document 100 and the amount of light irradiated by the illumination lamp 202. Generally, there is a greater degree of show-through the thinner the paper is for the document, and the greater the amount of light irradiated. In addition, there is influence from the density value of the image printed on the back surface, and show-through is more likely to occur if a high density image is printed on the back surface.

Figure 3:
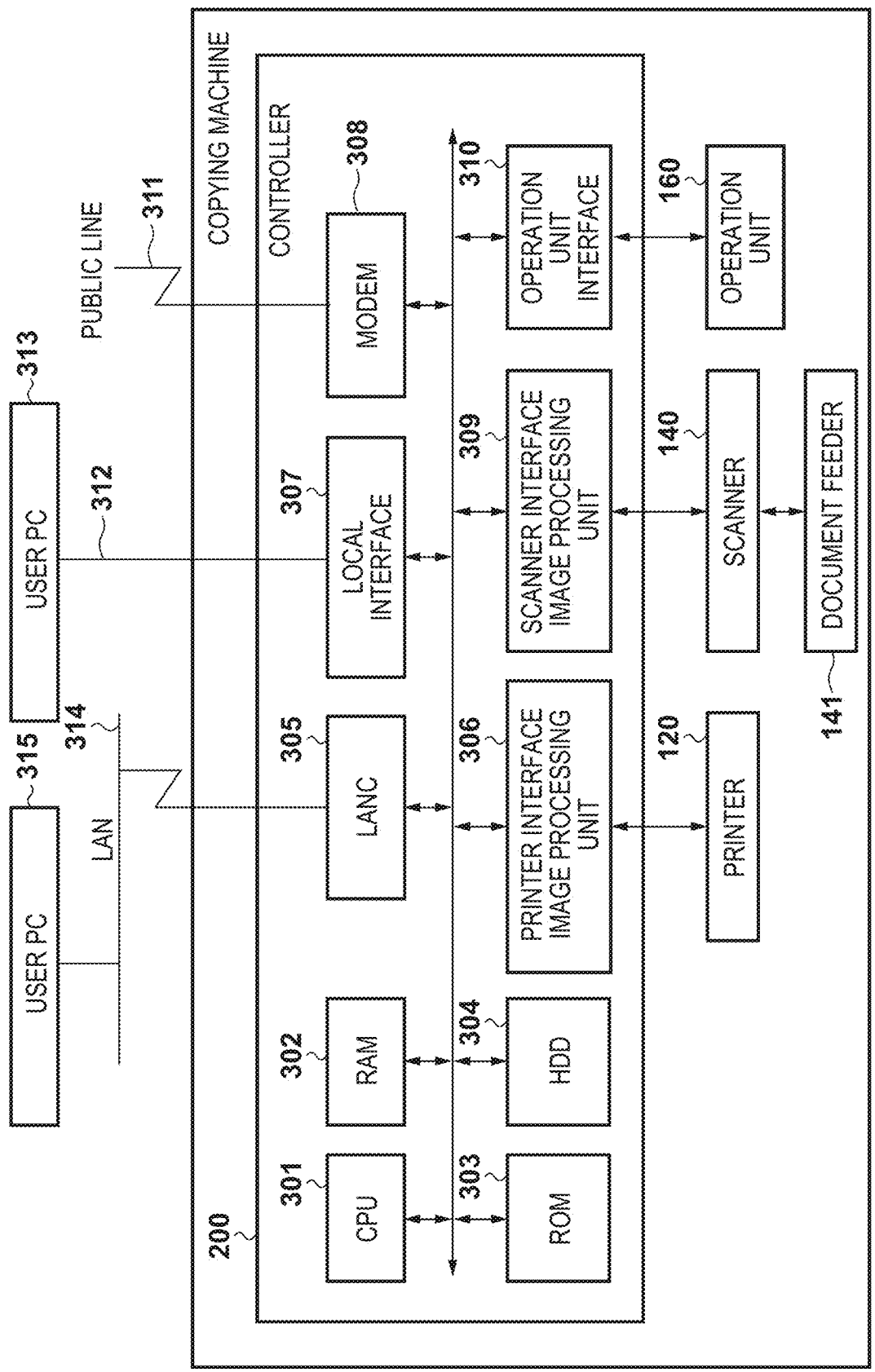
FIG. 3 is a diagram for describing the hardware configuration of a multi-function peripheral and the entire system that includes the copying machine according to the embodiment.

FIG. 3 is a diagram for describing the hardware configuration of a multi-function peripheral and the entire system that includes the copying machine according to the embodiment.

The controller 200 is connected to the scanner 140, the printer 120, a LAN 314, and a public line (a WAN) 311, and controls the operation of the copying machine as a whole, and controls the input and output of image information and device information.

A CPU 301 is a processor that controls the entire copying machine, and executes a control program or the like deployed from a HDD 304 to a RAM 302 in accordance with a boot program of a ROM 303 to control access to various devices in a comprehensive manner. Further, the CPU 301 comprehensively controls various image processes performed by the controller 200. The RAM 302 is a system memory, and is also an image memory for temporarily storing image data and the like. The ROM 303 is a boot ROM, and stores a boot program of the system. The HDD 304 is a hard disk drive, and mainly stores information (system software) and image data required for activating and operating a computer. This data may be stored in a recording medium that can be stored and held even when a power supply is turned off, with no limitation to the HDD 304.

A LAN controller (LANC) 305 is connected to the LAN 314, and inputs and outputs image data for output and information related to device control to and from a user PC 315. A local interface 307 is an interface for USB, Centronics, or the like, and is connected to a user PC 313, a printer, or the like via a cable 312 to input/output data. A modem 308 is connected to the public line 311 to input and output data. A printer interface image processing unit 306 is connected to the printer 120 and communicates with a CPU mounted in the printer 120. The printer interface image processing unit 306 performs synchronous/asynchronous conversion of image data and image processing for printing in accordance with a command from the CPU 301. A scanner interface image processing unit 309 is connected to the scanner 140 and communicates with a CPU mounted in the scanner 140. In addition, the scanner interface image processing unit 309 performs image processing such as synchronous/asynchronous conversion of image data, and a show-through correction process which is described later. An operation unit interface 310 is an interface for outputting image data to be displayed on the operation unit 160 from the controller 200 to the operation unit 160, and for outputting information inputted from the operation unit 160 by a user of the copying machine to the controller 200.

Figure 4:
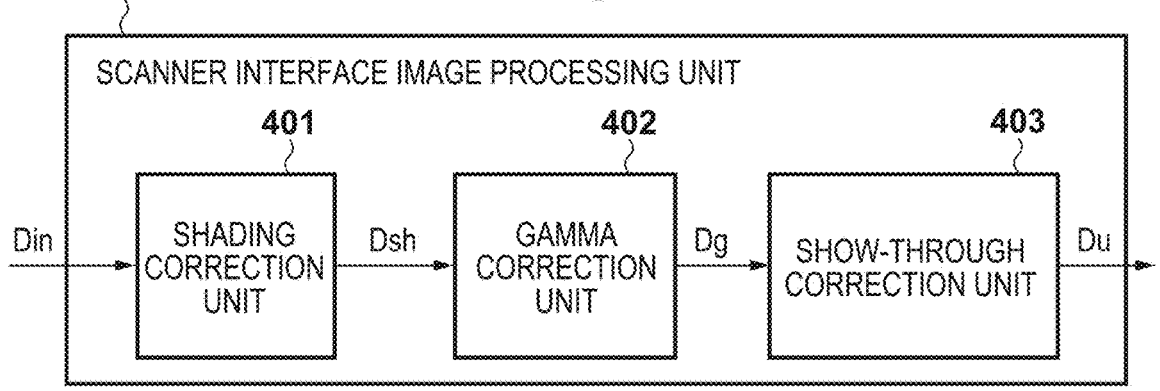
FIG. 4 is a block diagram for describing a configuration of a scanner interface image processing unit according to an embodiment.

FIG. 4 is a block diagram for describing a configuration of the scanner interface image processing unit 309 according to the embodiment.

A shading correction unit 401 receives, as an input, a pixel signal Din (see FIG. 2) which indicates a luminance outputted by the scanner 140. The shading correction unit 401 performs shading correction processing on luminance unevenness due to the characteristics of the optical system and the imaging system using a known technique so as to obtain image data of uniform brightness. A pixel signal Dsh thus subjected to the shading correction processing is outputted to a gamma correction unit 402 which is a subsequent stage. The gamma correction unit 402 corrects a difference in color characteristics between a reading device (scanner) and an output device (printer) using a known technique. A pixel signal Dg thus subjected to the gamma correction process is outputted to a show-through correction unit 403 which is a subsequent stage.

When show-through has occurred in the read image data of the front surface of a document read by the scanner 140, the show-through correction unit 403 executes a process of reducing the show-through. Note that the show-through correction unit 403 executes both generation of show-through correction information as an index of the show-through correction, and a show-through correction process which uses the show-through correction information. A pixel signal Du thus subjected to the show-through correction process is outputted from the scanner interface image processing unit 309, and written in the RAM 302 by a memory controller (not shown) to be temporarily stored.

Figure 5:
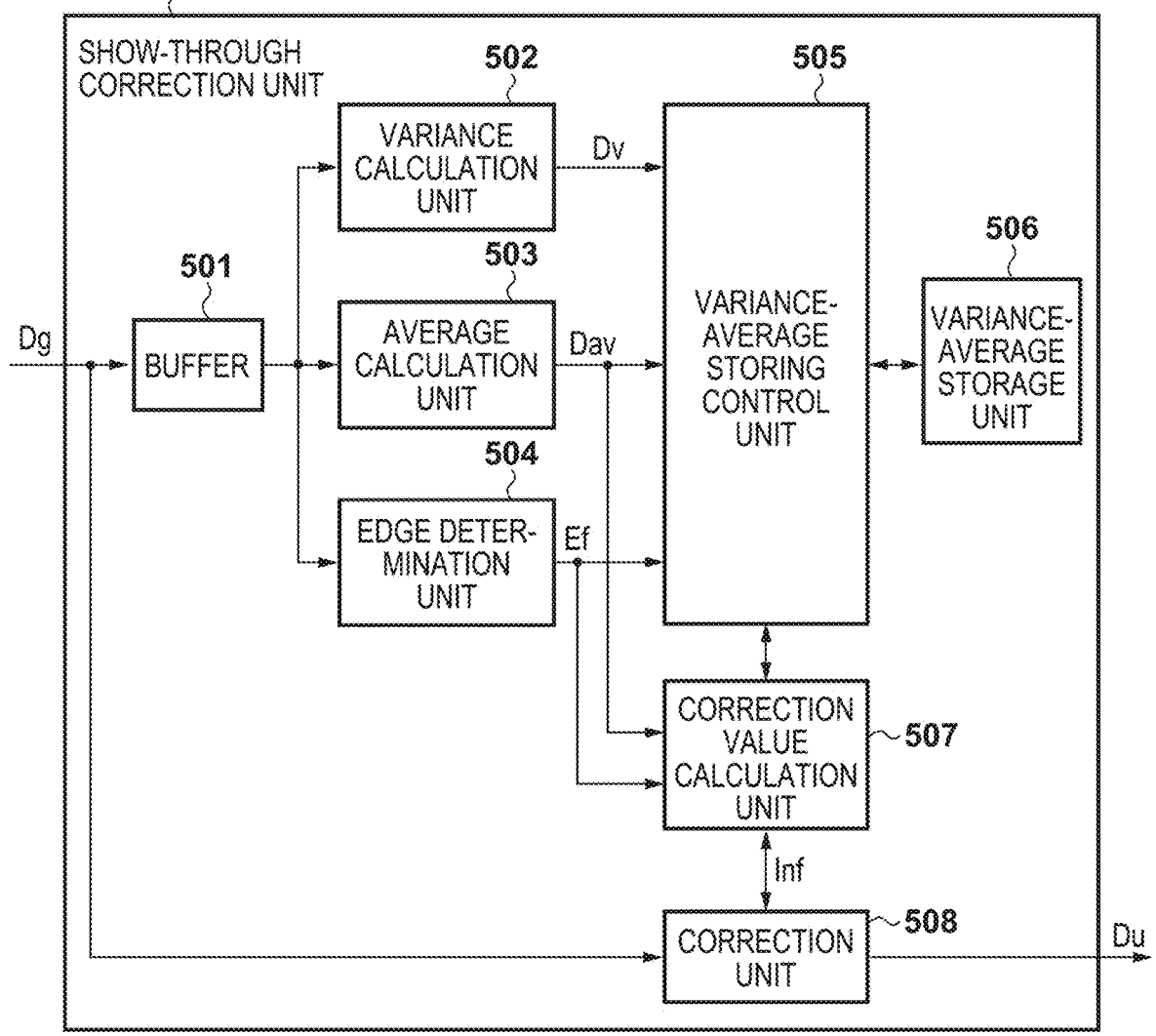
FIG. 5 is a block diagram for describing a configuration of a show-through correction unit according to an embodiment.

FIG. 5 is a block diagram for describing a configuration of the show-through correction unit 403 according to the embodiment.

A buffer 501 is a buffer for temporarily storing the pixel signal Dg which is to be inputted to the show-through correction unit 403. Because it is necessary to refer to a window of a predetermined size centered on the pixel of interest in the calculation of a variance or an average and edge determination of the subsequent stage, the buffer 501 is used for forming this window. For example, in latter-stage processing, if reference of a 5×5 window is necessary, the buffer size is 5 lines, and if reference of a 7×7 window is necessary, the buffer size is 7 lines.

A variance calculation unit 502 collectively receives pixel signals of a window size required for calculation from the buffer 501, and executes calculation of the variance. The variance is calculated by the following Equation (1).

$$\sigma^2 = \left(\frac{1}{N}\right)\sum_{k=1}^{k=N}(Xk - Xa)^2 \qquad \text{Equation (1)}$$

Where N represents the number of pixels within the window size. Xk denotes the k-th pixel signal value in the window size, and Xa denotes the average of the pixel signal values in the window size. Note that, because the variance tends to be a large value, the variance may be substituted by the standard deviation ($\sigma$).

An average calculation unit 503 collectively receives pixel signals of a window size required for calculation from the buffer 501, and executes calculation of the average. The average is calculated by the following Equation (2).

$$Xa = \left(\frac{1}{N}\right)\sum_{k=1}^{k=N} Xk \qquad \text{Equation (2)}$$

The definition of each symbol in the Equation (2) is the same as that in the Equation (1). Note that the window size necessary for calculating the average is the same as the window size necessary for calculating the above-mentioned variance.

An edge determination unit 504 collectively receives pixel signals corresponding to the window size required for calculation from the buffer 501, and determines whether or not the pixel of interest is in the edge region. Edge determination may be performed using a known technique. More specifically, a Prewitt filter or a Sobel filter is applied to a window centered on a pixel of interest, and it is determined whether or not there is an edge region based on a calculation result and thresholds.

A variance-average storing control unit 505 controls writing of data to a variance-average storage unit 506, and readout of data from the variance-average storage unit 506. The variance-average storage unit 506 stores the average for each variance in the format of an LUT (lookup table). For example, the variance becomes an address of the LUT, and an average corresponding to the variance is stored as data at the address. Note that the stored average is not the value calculated by the average calculation unit 503 unchanged, but a value adjusted by the variance-average storing control unit 505. Details thereof will be described later. Further, the variance-average storing control unit 505 outputs the average read out from the variance-average storage unit 506 to a correction value calculation unit 507.

Here, the average read out from the variance-average storage unit 506 becomes the show-through correction information (in other words an index for show-through correction) in the embodiment. Incidentally, the details of the variance-average storing control unit 505, including why it can be an index, will be described later with reference to FIG. 6.

The correction value calculation unit 507 calculates a correction value for correcting the pixel signal Dg. Specifically, a difference value resulting from subtracting the average in the current region of interest calculated by the average calculation unit 503 from the average based on the show-through correction information Inf received from the variance-average storing control unit 505 is obtained, and the difference value is used as a correction value. Here, since the highest (brightest) average in the image data is stored as the average in accordance with the show-through correction information Inf, the difference from the average of the region of interest is always equal to or greater than "0". This difference is outputted to a correction unit 508 as a correction value. At this time, it is assumed that the correction value calculation unit 507 outputs a correction value equivalent to a correction value of the neighboring non-edge portion when the edge determination unit 504 determines that there is an edge region.

Based on the correction information Inf received from the correction value calculation unit 507, the correction unit 508 executes a show-through correction process on the inputted pixel signal Dg. In this show-through correction process, for example, a correction value is added to the luminance value of the pixel signal Dg to make the pixel signal Dg brighter. If the inputted pixel signal is a pixel signal for which there is no show-through, the above-mentioned difference value becomes small and the correction information becomes small. In addition, instead of simply adding the correction value, correction may be performed by applying a gain in accordance with an inputted pixel signal value. For example, the brighter the inputted pixel signal value is, the more susceptible it is to show-through, and therefore a gain may be applied so that the brighter the pixel signal is, the stronger the correction is. The corrected pixel signal values are written to the RAM 302 as Du.

The variance of a read halftone dot image has a distribution in which the vertex of a maximum value is 50% of the amount of halftone dots in a region of interest (window size), and where the amount is 50% or more is the same as where the amount is less than 50%. When the amount of halftone dots is 0% or 100%, the variance takes a minimum value. This is shown in FIG. 11.

FIG. 11 depicts a graph view showing a relationship among a halftone dot ratio, a variance, and an average in a halftone dot image.

Referring to FIG. 11, the same variance is generated at different averages. However, here, it is sufficient if the show-through correction processing is directed to less than 50% of the halftone dot ratio. That is, configuration may be taken to set a boundary where the density of the average becomes an intermediate density, and to perform correction by targeting where the density of the average is less than or equal to the boundary. This is because, if the density of the average is equal to or higher than the intermediate density, the density of the front surface will increase, and it is less likely to be affected by show-through. In this way, the relationship between variance and average is unique. Further, when the halftone dot ratio is a density of 50% or more, it is sufficient if the correction value has a small gain. Processing in consideration of the halftone dot ratio is implemented in the correction unit 508 described above.

Incidentally, in the embodiment, this processing is individually executed for each color. Therefore, the variance-average storage unit 506 stores the average of each variance individually for each color. In this manner, even if the show-through component is a color (e.g., a show-through component of a red character, or the like), the correction can be performed by having each color individually.

FIG. 10 is a diagram showing an example of an LUT generated by the variance-average storage unit 506 according to the embodiment.

The variance in the first row indicates addresses of the LUT, and the averages in the second row indicates the data stored in each address of the LUT. Here, the address of the LUT indicates the variance, but may be substituted by the standard deviation ($\sigma$) in order to reduce the numerical value. There is no change in that the standard deviation means a numerical value that indicates a level of variation similarly to variance.

Next, the relationship between the variance and the average stored in this LUT will be described.

For example, the value indicated by the variance 0 (address 0) is either a solid color portion or a paper white portion if the influence of show-through is not taken into consideration. Here, since the average stored in the LUT is the numerically highest (brightest) average in the image, the average stored in the address of the variance 0 inevitably becomes the average of the paper white. Then, as the variance (address) gradually increases, the number of pixels of the halftone dot in the image increases, and thus the average (luminance data) to be stored gets low (dark). Therefore, the data stored in each address of the LUT formed after referring to the image of one page has a value as shown in FIG. 10, for example.

The LUT may be configured so as to have dimensions corresponding to the number of colors, instead of having an individual LUT for each color. For example, in the case of three colors in RGB, the LUT may have a three-dimensional configuration formed by [R variance][G variance][B variance], where an average of each color is stored.

Next, the variance-average storing control unit 505 according to an embodiment will be described in detail with reference to FIG. 6.

Figure 6:
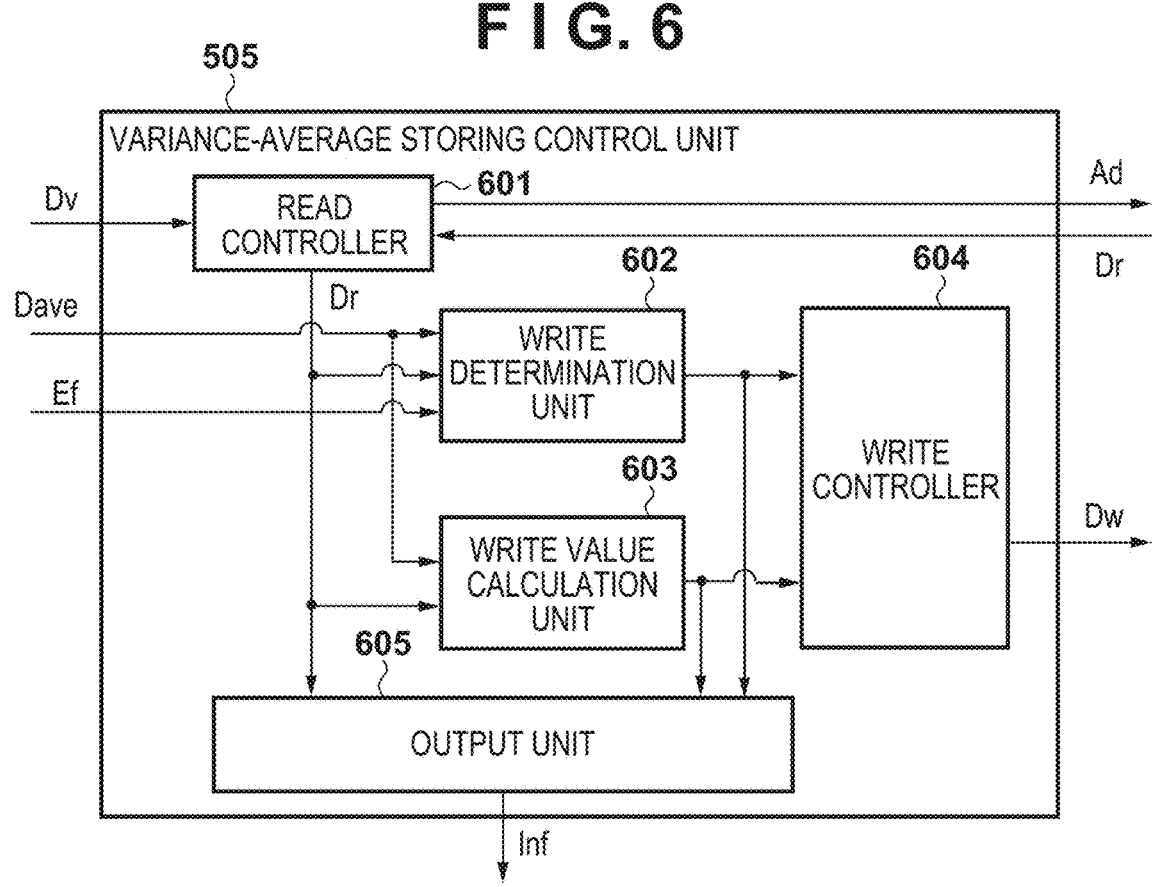
FIG. 6 is a block diagram for describing a configuration of a variance-average storing control unit according to an embodiment.

FIG. 6 is a block diagram for describing a configuration of the variance-average storing control unit 505 according to the embodiment.

A read controller 601 receives the variance Dv from the variance calculation unit 502. Then, the read controller 601 accesses the variance-average storage unit 506 with the received variance Dv as an address (Ad). In the embodiment, the variance-average storage unit 506 stores an average (LUT data) for each variance (LUT address) in the LUT format. Accordingly, the read controller 601 accesses the variance-average storage unit 506 with the variance Dv as an address Ad of the LUT. Then, the read controller 601 receives the LUT read data Dr corresponding to the address Ad of the LUT from the variance-average storage unit 506. This LUT read data Dr is inputted to each block to be described later. Incidentally, the initial value of the LUT read data Dr is set to "0".

A write determination unit 602 receives the LUT read data Dr from the read controller 601, an average Dave of the window centered on the pixel of interest from the average calculation unit 503, and an edge determination result Ef from the edge determination unit 504, and executes a write determination. This write determination is a determination as to whether or not to overwrite the LUT data held in the LUT address Ad read by the read controller 601. More specifically, first, referring to the edge determination result Ef, when it is determined that there is an edge region, not overwriting the LUT data is determined. This is because, in the edge region, the calculation result of the variance around the pixel of interest is affected by the edge and it is inappropriate as an index of the show-through correction.

Next, referring to the edge determination result Ef, when it is determined that there is not the edge region, it is determined whether or not the average Dave is larger than the LUT read data Dr. Here, when the average Dave is larger than the LUT read data Dr (that is, when the average of the pixel of interest window is brighter than the average stored in the LUT), overwriting the LUT data is determined. On the other hand, when the average Dave is equal to or less than the LUT read data Dr, not overwriting data is determined. The determination result is outputted to a write controller 604 that is described later.

A write value calculation unit 603 receives the LUT read data Dr from the read controller 601, receives an average Dave of the window centered on the pixel of interest from the average calculation unit 503, and executes processing to calculate a write value. This write value is a value for overwriting the LUT data held in the LUT address Ad read by the read controller 601.

Figure 7:
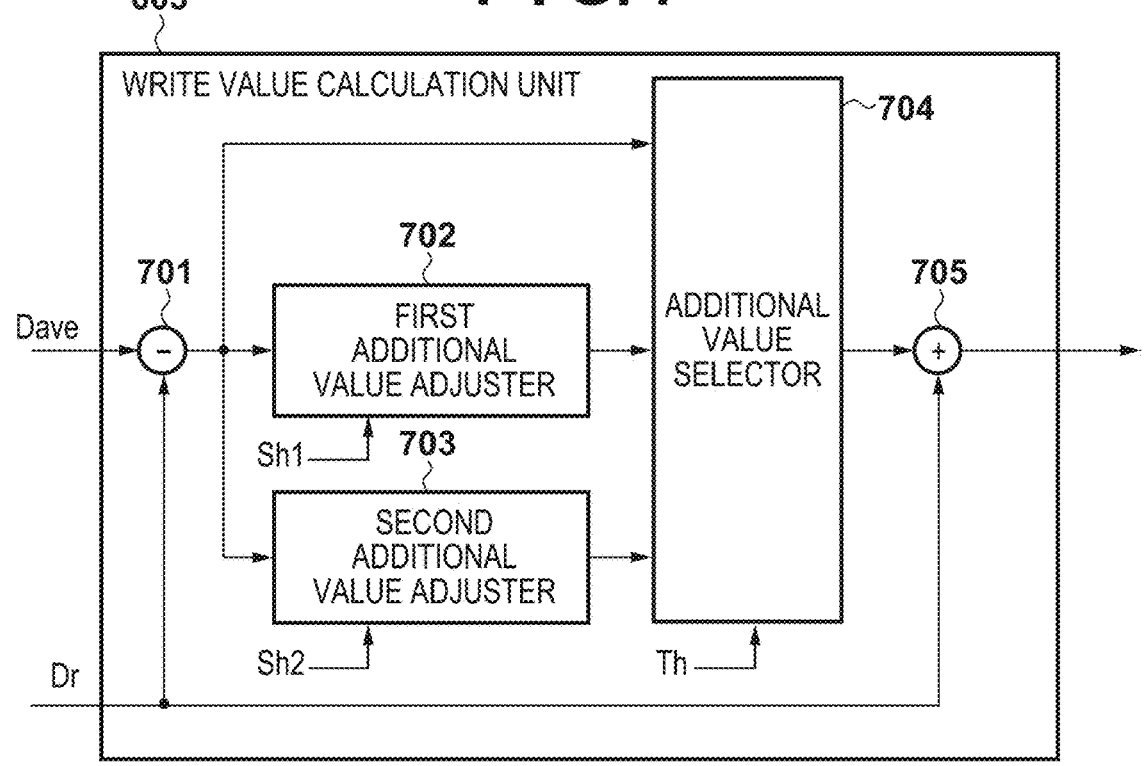
FIG. 7 is a block diagram for describing a configuration of a write value calculation unit according to an embodiment.

FIG. 7 is a block diagram for describing a configuration of the write value calculation unit 603 according to the embodiment.

A subtracter 701 subtracts the LUT read data Dr from the average Dave to calculate a difference value. However, when the LUT read data Dr is larger than the average Dave, a result of this calculation is set to "0". A first additional value adjuster 702 multiplies the above-mentioned difference value by an adjustment amount Sh1 and outputs the result. A second additional value adjuster 703 multiplies the above-mentioned difference value by an adjustment amount Sh2 and outputs the result. Here, these adjustment amounts Sh1 and Sh2 are both values of 1 or less. Therefore, the outputs from the adjusters 702 and 703 are the same (when the adjustment amounts Sh1 and Sh2 are 1) or a smaller value (when the adjustment amounts Sh1 and Sh2 is less than 1), with respect to the above-mentioned difference value. Here, an intention for multiplying the adjustment amount to obtain a small value is to reduce the effect of impurities, which will be described later with reference to FIG. 8. Note that the adjustment amount Sh1 or Sh2 may be a right-shift amount with respect to the difference value. That is, when the shift amount is 1, the multiplication result is ½ of the difference value, and when the shift amount is 2, the multiplication result is ¼ of the difference value. In this way, it is possible to reduce the circuit cost of an additional value adjuster. Results of multiplication by the first additional value adjuster 702 and the second additional value adjuster 703 are outputted to the additional value selector 704.

The additional value selector 704 selects one of the multiplication results of the first additional value adjuster 702 and the second additional value adjuster 703, and outputs the selected multiplication result. First, the additional value selector 704 determines whether or not the inputted multiplication result is equal to or larger than a threshold Th. If the multiplication result is equal to or larger than the threshold Th, the multiplication result of the first additional value adjuster 702 is selected, and the selected value is outputted to the subsequent stage. If the multiplication result is less than the threshold Th, the multiplication result of the second additional value adjuster 703 is selected, and the selected value is outputted to the subsequent stage. An adder 705 performs a process of adding the multiplication result outputted from the additional value selector 704 to the LUT read data Dr, and outputs the result of this addition. This output result is a write value to the LUT that is outputted by the write value calculation unit 603.

Next, the write controller 604 of FIG. 6 refers to the determination result of the write determination unit 602 and the write value of the write value calculation unit 603, and performs write control with respect to the LUT. If the determination result of the write determination unit 602 is "perform overwriting of LUT data" here, the write controller 604 executes writing of the write value to the LUT address Ad accessed by the read controller 601 earlier. That is, the write value outputted from the write value calculation unit 603 is outputted to the variance-average storage unit 506 as LUT write data Dw. The LUT data corresponding to the LUT address Ad is overwritten in this manner. As a result, the calculation result relating to the brightest average luminance value is always held in the LUT data for the region showing the same variance of the window centered on the pixel of interest. The calculation result of the brightest average luminance value indicates the luminance information of the region that does not have show-through, and is used for the calculation of the correction value at a subsequent stage.

An output unit 605 refers to the LUT read data Dr, the write determination result, and the calculation result of the write value, and outputs the show-through correction information Inf (an index for show-through correction) to the correction unit 508. When the determination result of the write determination unit 602 is "perform overwriting of LUT data", the output unit 605 outputs the value outputted by the write value calculation unit 603 to the correction value calculation unit 507 as the show-through correction information Inf. When the determination result of the write determination unit 602 is "do not perform overwriting of LUT data", the output unit 605 outputs the LUT read data Dr outputted by the read controller 601 to the correction value calculation unit 507 as the show-through correction information Inf.

Next, the detailed meaning of the data (show-through correction information) stored in the variance-average storage unit 506 will be described with reference to FIG. 8.

Figure 8:
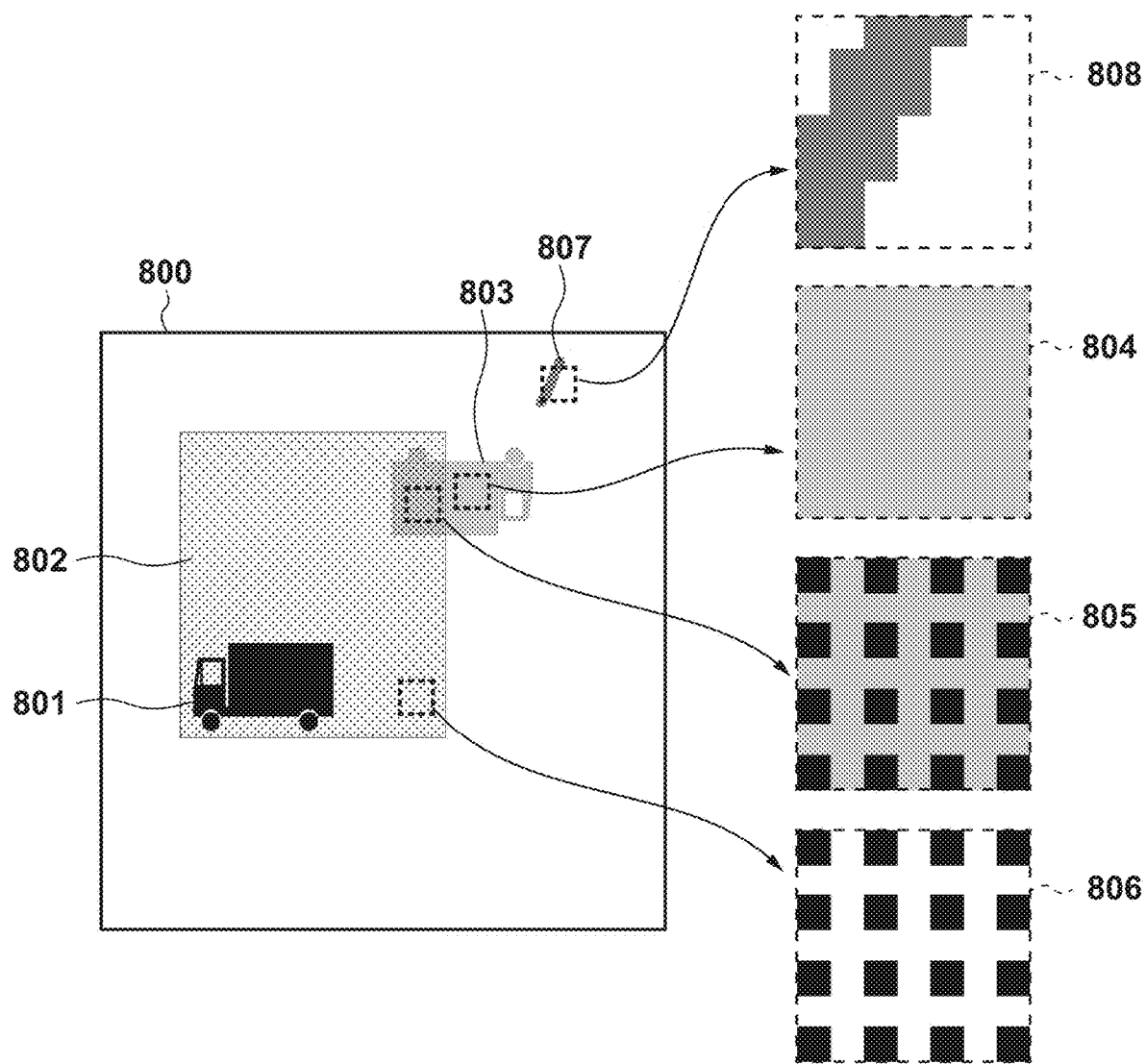
FIG. 8 is a diagram for describing an example of read image data of a front surface of a document read by a scanner according to an embodiment.

FIG. 8 is a diagram for describing an example of read image data 800 of a front surface of a document read by the scanner 140 according to the embodiment.

A high density image 801 and a halftone-processed image 802 represented by halftone dots are printed on the front surface of an actual document. It is also assumed that an image similar to the high density image 801 exists on the back surface of the document. At this time, in the read image data 800 of the front surface of the document read by the scanner 140, a high density image existing on the back surface of the document becomes as a show-through image 803.

Attention is paid to each region of the read image data 800. Firstly, a region of the halftone-processed image 802 is focused on and illustrated as a halftone region of interest 806. Since the halftone region of interest 806 has a halftone dot structure, pixels are divided into those in regions in which there is a halftone dot, and those in regions in which there is no halftone dot. Here, these regions are divided by a predetermined window size, and the luminance variance and the luminance average are calculated to thereby obtain a variance X2 and an average Y2.

Next, a region of the show-through image 803 is focused on and illustrated as a show-through region of interest 804. In the show-through region of interest 804, these regions are divided by a predetermined window size, and the luminance variance and the luminance average are calculated to thereby obtain a variance X1 and an average Y3. Here, the luminance variance X1 obtained in the show-through region of interest 804 is a small value. This is because only a low-frequency component of the image on the back surface is likely to appear as a show-through component (an image component obtained through the paper). Therefore, even if the image on the back surface is drawn by the halftone dots, there are many cases where show-through occurs without uneven luminance for the show-through component as with the show-through region of interest 804, and as a result, the luminance variance becomes a small value.

Further, in the read image data 800, a luminance variance and luminance average obtained by dividing a paper white region, on which nothing has been printed and for which there is no show-through, by a predetermined window size are set as X1 and Y4 respectively. Here, since the show-through component tends not to affect the luminance variance as described above, the luminance variance of the paper white region and the luminance variance obtained from the region of the show-through image 803 tend to be similar values. Here, this luminance variance is set to X1.

Next, a region in which the halftone-processed image 802 and the show-through image 803 overlap with each other is given attention and illustrated as an overlapping region of interest 805. Since the overlapping region of interest 805 has a halftone dot structure, pixels are divided into those in regions in which there is a halftone dot, and those in regions in which there is no halftone dot. However, since this overlapping region is affected by the show-through image, it has a pixel value which is dark (low in value) overall. In the overlapping region of interest 805, these regions are divided by a predetermined window size, and the luminance variance and the luminance average are calculated to thereby obtain a variance X2 and an average Y1. Here, since the show-through component tends not to affect the luminance variance as described above, the luminance variance of the overlapping region of interest 805 and the luminance variance obtained from the halftone region of interest 806 of the halftone-processed image 802 that did not have show-through are likely to have similar values. Here, this luminance variance is set to X2.

Next, processing for obtaining an index in the show-through correction (show-through correction information) will be described using the above-described luminance variances X1 and X2 and the luminance averages Y1 to Y4. The variances X1, X2 and the luminance averages Y1 to Y4 are graphically illustrated in FIG. 9.

FIG. 9 is a diagram showing a relationship between a variance and an average of luminance values of read image data.

In FIG. 9, coordinates (X1, Y4) indicate a paper white region, coordinates (X1, Y3) indicate a show-through region of interest 804, coordinates (X2, Y2) indicate a halftone region of interest 806, and coordinates (X2, Y1) indicate an overlapping region of interest 805. In other words, it can be said that the paper white region is the coordinates (X1, Y4), and the coordinates (X1, Y3) are where show-through occurs in the paper white region. In other words, it can be said that the halftone region of interest 806 is the coordinates (X2, Y2), and the coordinates (X2, Y1) are where show-through occurs in the halftone region.

Therefore, when the pixel of interest is corrected using the difference value between Y3 and Y4 in the show-through region of interest 804, the signal value of the show-through region is corrected to the signal value of the paper white region, and show-through correction is appropriately performed. Therefore, when the pixel of interest is corrected using the difference value between Y1 and Y2 in the overlapping region of interest 805, the signal value of the overlapping region is corrected to the signal value of the halftone region of interest, and show-through correction is appropriately performed. In other words, at each variance, the average of a region where there is no show-through can be used as an index for correcting the show-through (that is, the show-through correction information).

This index is the show-through correction information Inf that the output unit 605 outputs to the correction value calculation unit 507. As described with reference to FIG. 6, the average and the variance of a pixel of interest window are sequentially calculated and compared with the brightest calculation result (the value held in the LUT for each variance) for a region in which the same variance was indicated in the past, to thereby make it possible to obtain this index.

Here, the variance depends on the amount of halftone dots in the region of interest. The amount of halftone dots is uniquely decided according to the density to be printed. Therefore, by storing the average for where there is no show-through of each variance, even when a show-through region or a region in which show-through and a halftone dot on the front surface overlap occurs, the show-through can be appropriately corrected by correcting the signal value using the stored average as an index. "Storing the average for each variance" means, in other words, "storing the average for each halftone dot amount".

Here, in order to obtain an appropriate index, it is necessary to obtain an average for where there is no show-through. In order to easily obtain this, in the embodiment, as described with respect to the variance-average storage unit 506, the highest average for each variance in the input image data is used as an index. This utilizes the fact that regions that do not have show-through can have a higher (brighter) average than show-through regions. Since an entire halftone dot region in the input image data is rarely included in a show-through region, in most cases there is a halftone dot region for which there is no show-through, and thus even if such a method were employed, it should be able to sufficiently withstand actual use.

Further, as in the embodiment, even when, from out of the inputted image data, the brightest average in image regions processed in the past before the pixel of interest currently being processed is reached is used as the show-through correction information, it is possible to store appropriate show-through correction information. This is because it is rare for only show-through regions to consecutively continue in an actual document, and it can be considered to be able to withstand actual use regardless of the form of the embodiment.

Next, a case where a document has impurities will be considered.

In FIG. 8, a minute impurity 807 such as a fiber of a document has occurred on the front surface of the document.

A place where attention is given to the impurity 807 is shown as an impurity region of interest 808. The impurity region of interest 808 includes a pixel region in which the luminance value has darkened due to the impurity and pixel regions in which the luminance value is not dark. At this time, when the luminance variance is calculated using the impurity region of interest 808 as the region of interest, the luminance variance is obtained in accordance with the luminance difference of pixel regions as described above. Further, since this region of interest includes a high proportion of a paper white region, when the luminance average is calculated for this region, a large bright average is often obtained. Therefore, there is a possibility that this calculation result will be stored in the LUT of the variance-average storage unit 506 as an index for correcting erroneous show-through. When such data is stored in the LUT, the calculation result of the correction value in the correction value calculation unit 507 becomes unnecessarily large, which is a result that leads to overcorrection or false correction of show-through. If the edge determination unit 504 can determine that such a region of interest is an edge region, such an adverse effect can be prevented. However, the impurity 807 is small, and its luminance value does not have a large difference as compared with the luminance value of a paper white region. Therefore, in the edge determination process as described with the edge determination unit 504, it is difficult to perform an appropriate process of determining the impurity region as the edge portion while not determining a halftone dot region as the edge portion.

Therefore, in the embodiment, as described with reference to FIG. 7, the write value calculation unit 603 is provided with the additional value adjusters 702 and 703, so that the data to be overwritten on the LUT is adjusted to reduce the influence of impurities. In addition, the normal index value for the show-through correction is also affected by the additional value adjustment processing, but the same luminance variance can be obtained many times for uniform halftone dot regions in the document, so that the effect of the show-through correction is not remarkably lowered. This will be described with reference to FIGS. 12A to 12C.

Figure 12A:
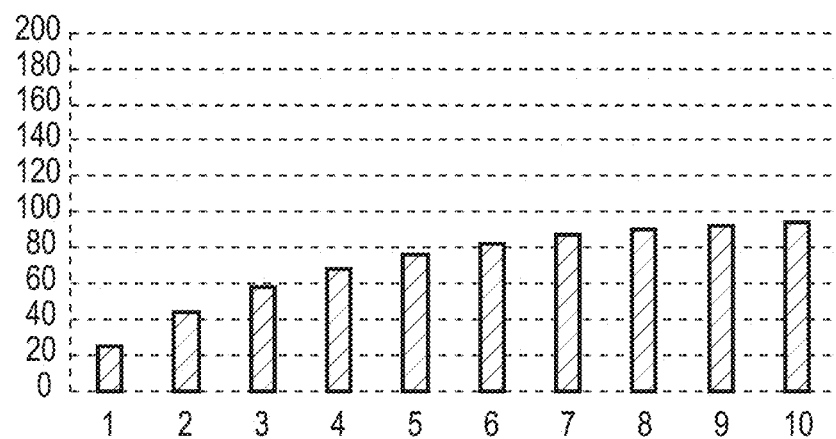
FIGS. 12A to 12C are diagrams illustrating an example of updating a variance-average storage unit (an LUT) in an embodiment.
Figure 12B:
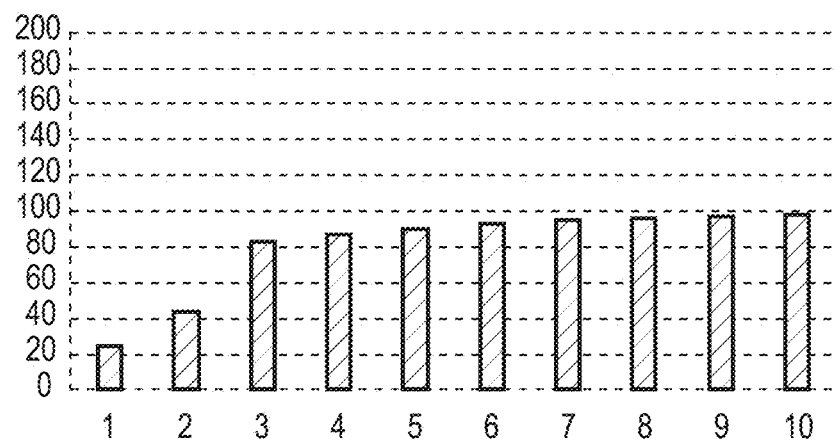
Figure 12C:
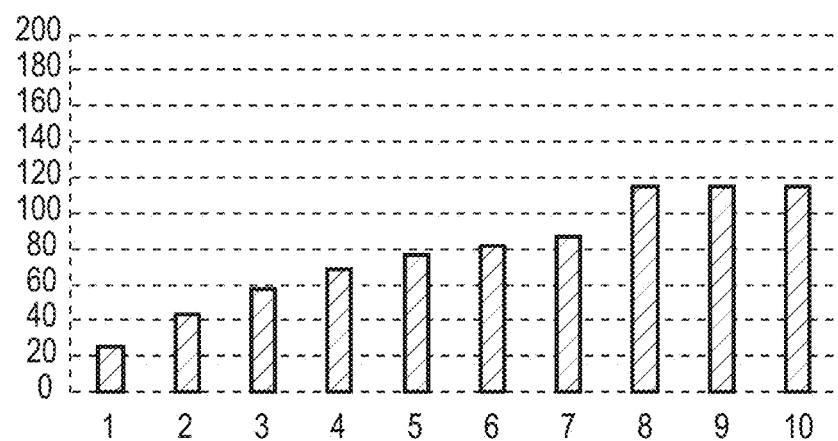

FIGS. 12A to 12C are diagrams illustrating an example of updating a variance-average storage unit (an LUT) in the embodiment.

In FIGS. 12A to 12C, the abscissa represents the count of overwriting of the LUT of the variance-average storage unit 506, and the vertical axis represents the value of overwriting. In other words, the abscissa represents the number of writes by the write controller 604, and the ordinate represents the LUT write data Dw at the time of the corresponding write. FIGS. 12A to 12C show an example of focusing on a specific address of the LUT (in other words, a specific luminance variance).

First, FIG. 12A shows an example of a case where there is no influence of impurities. At this time, in the halftone region of interest 806 that has no show-through in FIG. 8, an average which can be an index of the show-through correction is calculated and written in the LUT. At this time, if the calculated average is "100", the value written in the LUT becomes a numerical value of "100" or less in accordance with the adjustment processing of the first additional value adjuster 702 or the second additional value adjuster 703. For example, when the adjustment amounts Sh1 and Sh2 are "0.25", the first write data is 100×0.25 which is "25". In this case, the effect of the show-through correction appears to have deteriorated, but this is not the case because there are many such halftone regions inside the image data 800. By repeatedly paying attention to and processing the same halftone region two or three times, the value written in the LUT approaches "100" which is the original average. In FIG. 12A, it can be seen that when writing is performed about 10 times, the value is nearly "100".

FIG. 12B shows an example of a case where there is an influence of an impurity. This example shows the case where the third write data is the impurity region of interest 808. For example, when the calculated average of the impurity region of interest 808 is "200" and the adjustment amount is "0.25" as in FIG. 12A, the third write data is a value smaller than "100", as shown in FIG. 12B. That is, the influence of impurities can be removed by the adjustment process. Thereafter, similarly to FIG. 12A, every time the writing to the LUT is repeated, the index of the show-through correction approaches "100".

FIG. 12C shows a different example of a case where there is an influence of an impurity. This example shows the case where the eighth write data is the impurity region of interest 808. For example, when the calculated average of the impurity region of interest 808 is "200" and the adjustment amount is "0.25" as in FIG. 12A, the eighth write data is a value larger than "100", as shown in FIG. 12C. However, the value is smaller than the average "200" calculated in the impurity region of interest 808. That is, the influence of impurities can be reduced by the adjustment process. Thereafter, the calculation of the average is repeated in the halftone region of interest 806, but since its value becomes smaller than the current value of the LUT, the writing of the LUT is not executed.

As described above, the influence of impurities can be reduced by the adjustment processing of the first additional value adjuster 702 or the second additional value adjuster 703. In addition, since halftone dot regions occupies a larger proportion of the page than impurities, in other words, since the number of repetitions is larger for halftone regions than impurity regions, the effect of correction of show-through can be maintained even in such adjustment processing.

Note that, when the current region of interest is an impurity region, as shown in FIGS. 12A to 12C, there is a tendency for a large value separated from a value already stored in the LUTs to often be calculated as the average Dave (i.e., the difference value by the subtracter 701 is large). Therefore, a small value close to "0" is set to the first coefficient, and a large value close to "1" is set to the second coefficient. Alternatively, configuration may be taken to set the same value for the first coefficient and the second coefficient, and always perform a calculation using a constant coefficient regardless of the difference value.

As described above, according to the embodiment, by implementing the write value calculation unit 603, it is possible to reduce the influence of an impurity which has adhered to the document while maintaining the effect of a show-through correction.

Figure 13:
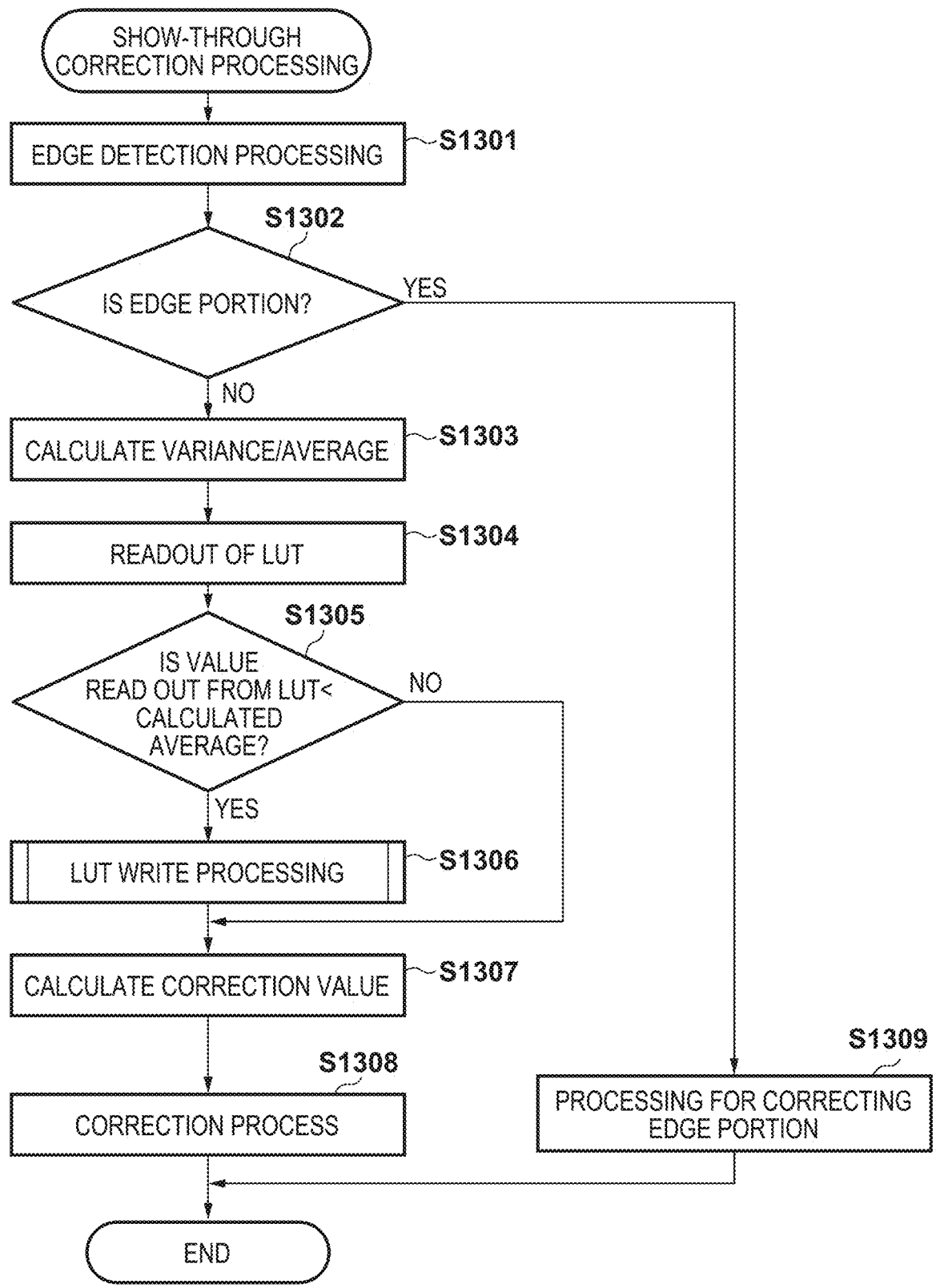
FIG. 13 is a flowchart for describing a show-through correction process in the copying machine according to the embodiment.

FIG. 13 is a flowchart for describing a show-through correction process in the copying machine according to the embodiment. Note that processing shown in this flowchart is realized by the CPU 301 deploying a program stored in the HDD 304 to the RAM 302 and executing the deployed program. In addition, in this description, an example is described in which the CPU 301 realizes the functions of the scanner interface image processing unit 309 described above by the CPU 301 executing a program, but the functions of the scanner interface image processing unit 309 may be realized by hardware, for example.

First, in step S1301, the CPU 301 executes edge detection processing on read image data. This is executed by, for example, the edge determination unit 504 which is described above, referring to a window (output of the buffer 501) centered on a pixel of interest of the read image data, and detecting an edge by a known technique. Next, the processing proceeds to step S1302, and the CPU 301 refers to an edge determination result of step S1301 and determines whether or not the pixel of interest is an edge portion. Here, when it is determined that the window is the edge portion, the processing proceeds to step S1309, and when it is determined that the window is not the edge portion, the processing proceeds to step S1303. In step S1309, the CPU 301 executes a process of correcting the edge portion. For example, a correction value of a neighboring non-edge portion is referred to, and the correction value is added to a signal value (luminance value) of an inputted pixel to brighten the pixel signal Du. Then, this processing ends.

In step S1303, the CPU 301 executes a calculation of the variance and the average. This is executed by, for example, the variance calculation unit 502 and the average calculation unit 503 described above. The CPU 301 refers to a window (the outputs of the buffer 501) centered on the pixel of interest of the read images. Then, the CPU 301 calculates a variance, which is a degree of variation in the signal values of the plurality of pixels, and an average of brightness, which is a feature amount indicating the brightness of the window. The CPU 301 then proceeds to step S1304 where it reads out the data from the LUT of the variance-average storage unit 506. This is executed by, for example, the read controller 601 of the above-mentioned variance-average storing control unit 505, and therefore the address of the LUT at the time of reading is the variance calculated in step S1303.

Then, proceeding to step S1305, the CPU 301 compares the value read out from the LUT in step S1304 with the average calculated in step S1303, and determines whether or not the calculated average is larger than the value read out. Here, if the readout value is larger than the calculated average, the processing proceeds to step S1307, and if the calculated average is larger, the processing proceeds to step S1306. In step S1306, the CPU 301 writes the calculated average to the LUT of the variance-average storage unit 506, and the processing proceeds to step S1307. This writing is executed, for example, by the above-described variance-average storing control unit 505. Note that the processing of this step S1306 will be described in detail later by referring to the flow chart of FIG. 14.

Next, in step S1307, the CPU 301 calculates a correction value for the show-through. This is executed, for example, by the correction value calculation unit 507 described above, and the difference value between the show-through correction information and the average calculated in step S1303 is obtained, and the difference value is decided as the correction value. Note that, if step S1306 is not executed, the data read out from the LUT in step S1304 becomes the show-through correction information, and if step S1306 is executed, the data written in step S1306 becomes the show-through correction information.

Then, the processing proceeds to step S1308, and the CPU 301 executes the show-through correction process on the inputted pixel (the pixel of interest in step S1301) and ends this process. This is executed by, for example, the correction unit 508 described above. Based on the correction value calculated in step S1307, for example, the pixel signal Dg is brightened by adding the correction value to the signal value (luminance value) of the inputted pixel. Alternatively, the inputted signal value of the pixel may be multiplied by a gain corresponding to the correction value.

Figure 14:
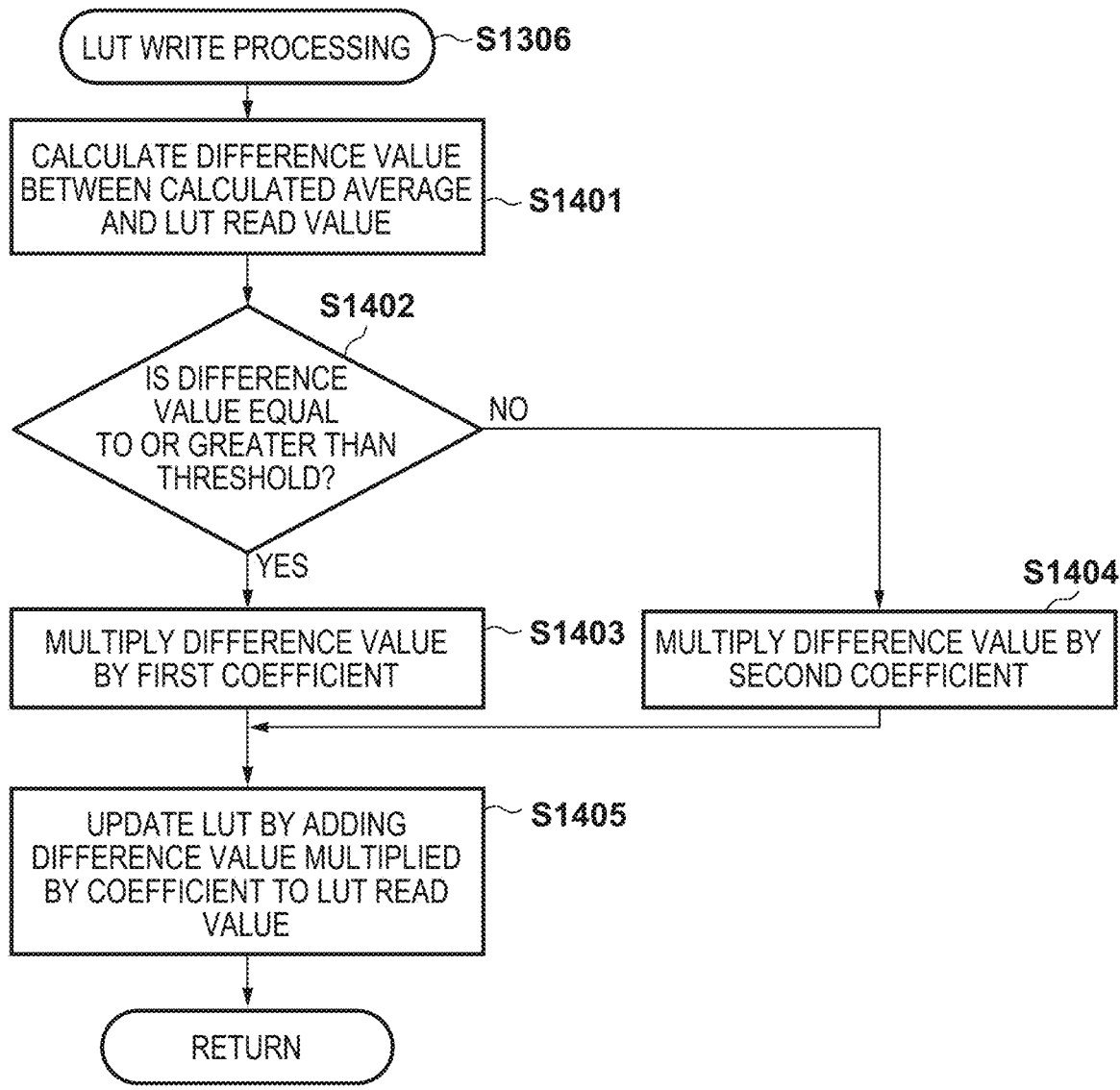
FIG. 14 is a flowchart for describing the process of writing to a LUT of step S1306 of FIG. 13.

FIG. 14 is a flowchart for describing the process of writing to a LUT of step S1306 of FIG. 13.

First, in step S1401, the CPU 301 subtracts, for example, the LUT read data Dr read out by the above-described read controller 601 in step S1304 from the average Dave calculated by the above-described average calculation unit 503 in step S1303, and to calculate the difference value therebetween, for example. This processing is executed by, for example, the subtracter 701 described above. Next, the processing proceeds to step S1402, and the CPU 301 determines whether or not the difference value calculated in step S1401 is equal to or larger than the threshold Th. This determination processing is executed by, for example, the additional value selector 704 described above. If the difference value is equal to or larger than the threshold Th, the process proceeds to step S1403, and if the difference value is smaller than the threshold Th, the process proceeds to step S1404. In step S1403, the CPU 301 performs the updating by multiplying the first coefficient and the difference value calculated in step S1401 by, for example, the above-mentioned first additional value adjuster 702, and the processing proceeds to step S1405. In step S1404, updating is performed by multiplying the second coefficient and the difference value calculated in step S1401 by, for example, the above-mentioned second additional value adjuster 703, and the processing proceeds to step S1405. As described above, these coefficients have a value of 1 or less, and the influence of an impurity of the document can be reduced by this coefficient processing. Since there are many more halftone dot regions which do not have show-through than the impurity regions, the effect of the show-through correction can also be maintained.

In step S1405, the CPU 301 adds, for example, the coefficient-processed difference value outputted from the above-described additional value selector 704 to the LUT read data Dr. This addition processing is executed by, for example, the adder 705 described above, and the result of this addition is written as LUT write data Dw to the variance-average storage unit 506. Note that the address to be written at this time is, for example, the LUT address Ad read out by the read controller 601 described above in step S1304. The written value is used in step S1307 as the show-through correction information.

As described above, according to the embodiment, even when impurities such as paper fibers occur in a read document, the influence of the impurities can be reduced, and show-through correction data can be appropriately calculated. Therefore, it is possible to appropriately correct a show-through region while reducing the deterioration of the image quality of a front surface.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-004622, filed Jan. 15, 2019, which is hereby incorporated by reference herein in its entirety.

What is claimed is:

1. An image processing apparatus, comprising:
at least one processor or at least one circuit that causes the image processing apparatus to function as:
a first obtaining unit configured to obtain a degree of variation in signal values of a plurality of pixels included in a region of a predetermined size that includes a target pixel of image data obtained by reading a document;
a second obtaining unit configured to obtain a feature amount indicating a brightness of the region of the predetermined size;
an updating unit configured to update a difference between an index value corresponding to the degree of variation and the feature amount based on an amount of a difference between an index value corresponding to the degree of variation obtained by the first obtaining unit in a plurality of index values respectively corresponding to a plurality of degrees of variation and the feature amount obtained by the second obtaining unit;
a decision unit configured to decide a correction value of the target pixel using the updated difference updated by the updating unit and the index value corresponding to the degree of variation obtained by the first obtaining unit; and
a correction unit configured to correct a value of the target pixel using the correction value decided by the decision unit.

2. The image processing apparatus according to claim 1, wherein the updating unit updates the difference by multiplying the difference by a first coefficient in a case where the difference is equal to or greater than the predetermined threshold, and multiplying the difference by a second coefficient that is greater than the first coefficient in a case where the difference is less than the predetermined threshold.

3. The image processing apparatus according to claim 2, wherein the first coefficient and the second coefficient are values that are equal to or less than 1.

4. The image processing apparatus according to claim 1, wherein the decision unit decides a correction value of the target pixel by adding the updated difference updated by the updating unit to the index value corresponding to the degree of variation.

5. The image processing apparatus according to claim 1, wherein the at least one processor that executes the instructions to further function as a determination unit configured to determine whether or not the region includes an edge portion
wherein, in a case where the determination unit determines that the region includes the edge portion, the correction unit corrects a value of the target pixel using the correction value of a neighboring region that does not include the edge portion.

6. The image processing apparatus according to claim 1, wherein an index value corresponding to the degree of variation is held in a lookup table (LUT) that associates the degree of variation with the index value that corresponds to the degree of variation.

7. The image processing apparatus according to claim 1, wherein the feature amount is an average of a plurality of signal values that indicate brightnesses of respective pixels included in the region.

8. The image processing apparatus according to claim 1, wherein the degree of variation is a variance of signal values of a plurality of pixels included in the region.

9. The image processing apparatus according to claim 1, wherein the degree of variation is a standard deviation of signal values of a plurality of pixels included in the region.

10. An image processing method, comprising:
obtaining a degree of variation in signal values of a plurality of pixels included in a region of a predetermined size that includes a target pixel of image data obtained by reading a document;
obtaining a feature amount indicating a brightness of the region of the predetermined size;
updating a difference between an index value corresponding to the degree of variation and the feature amount based on an amount of a difference between an index value corresponding to the obtained degree of variation in a plurality of index values respectively corresponding to a plurality of degrees of variation and the obtained feature amount;
deciding a correction value of the target pixel using the updated difference and the index value corresponding to the degree of variation obtained in the obtaining; and
correcting a value of the target pixel using the decided correction value.

11. A non-transitory computer-readable storage medium storing a program for causing a processor to execute an image processing method, the method comprising:

obtaining a degree of variation in signal values of a plurality of pixels included in a region of a predetermined size that includes a target pixel of image data obtained by reading a document;

obtaining a feature amount indicating a brightness of the region of the predetermined size;

updating a difference between an index value corresponding to the degree of variation and the feature amount based on an amount of a difference between an index value corresponding to the obtained degree of variation in a plurality of index values respectively corresponding to a plurality of degrees of variation and the obtained feature amount;

deciding a correction value of the target pixel using the updated difference and the index value corresponding to the degree of variation obtained in the obtaining; and correcting a value of the target pixel using the decided correction value.

12. An image processing apparatus comprising:

at least one processor or at least one circuit that causes the image processing apparatus to function as:

a first obtaining unit configured to obtain a degree of variation in signal values of a plurality of pixels included in a region of a predetermined size that includes a target pixel of image data obtained by reading a document;

a second obtaining unit configured to obtain a feature amount indicating a brightness of the region of the predetermined size;

a changing unit configured to change an index value corresponding to the degree of variation obtained by the first obtaining unit in a plurality of index values respectively corresponding to a plurality of degrees of variation based on the feature amount obtained by the second obtaining unit;

a correction unit configured to correct a value of the target pixel using the index value changed by the changing unit; and a determining unit configured to determine whether a difference between the index value corresponding to the degree of variation obtained by the first obtaining unit in a plurality of index values respectively corresponding to a plurality of degrees of variation and the feature amount obtained by the second obtaining unit is not less than a predetermined threshold, wherein in a case that it is determined by the determination unit that the difference is not less than the predetermined threshold, the changing unit reduces a degree of changing of the index value corresponding to the degree of variation obtained by the first obtaining unit.

* * * * *